US012542346B2

(12) United States Patent
Fan et al.

(10) Patent No.: US 12,542,346 B2
(45) Date of Patent: Feb. 3, 2026

(54) ANTENNA STRUCTURE AND ELECTRONIC DEVICE

(71) Applicant: Wistron NeWeb Corporation, Hsinchu (TW)

(72) Inventors: Yu-Sheng Fan, Hsinchu (TW); Chia-Hao Chang, Hsinchu (TW); Hong-Jun Jian, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 103 days.

(21) Appl. No.: 18/731,439

(22) Filed: Jun. 3, 2024

(65) Prior Publication Data

US 2025/0112356 A1 Apr. 3, 2025

(30) Foreign Application Priority Data

Sep. 28, 2023 (TW) ................................ 112137339

(51) Int. Cl.

| | |
|---|---|
| ***H01Q 1/36*** | (2006.01) |
| ***H01Q 1/22*** | (2006.01) |
| ***H01Q 5/371*** | (2015.01) |
| ***H01Q 13/10*** | (2006.01) |

(52) U.S. Cl.

CPC ........... *H01Q 1/2266* (2013.01); *H01Q 5/371* (2015.01); *H01Q 13/10* (2013.01)

(58) Field of Classification Search

CPC ...... H01Q 1/2266; H01Q 5/371; H01Q 13/10; H01Q 13/106; H01Q 1/243

See application file for complete search history.

(56) References Cited

U.S. PATENT DOCUMENTS

| | | | | |
|---|---|---|---|---|
| 10,454,167 B2 | 10/2019 | Yu et al. | | |
| 2007/0042644 A1* | 2/2007 | Hsieh | ................ | H01R 13/6581 439/607.01 |
| 2007/0176831 A1* | 8/2007 | Lagnado | ............... | G06F 1/1698 343/702 |
| 2018/0090840 A1* | 3/2018 | Yu | ........................ | H01Q 21/064 |

(Continued)

FOREIGN PATENT DOCUMENTS

| | | |
|---|---|---|
| TW | 200911099 A | 3/2009 |
| TW | 201635632 A | 10/2016 |
| TW | 201814965 A | 4/2018 |

*Primary Examiner* — Dimary S Lopez Cruz
*Assistant Examiner* — Bamidele A Immanuel
(74) *Attorney, Agent, or Firm* — McClure, Qualey & Rodack, LLP

(57) ABSTRACT

An antenna structure disposed in a case includes a blocking part, a cooling module, an antenna module, and a ground component. The cooling module is disposed on a side of the blocking part. The antenna module is disposed on the side of the blocking part and has an interval space between the antenna module and the cooling module along a first direction. The ground component is disposed in the interval space, and is electrically connected to the antenna module and the cooling module. The ground component, the antenna module and the cooling module jointly define a slot in the interval space. The antenna module has a resonant frequency, and the antenna module couples and excites the slot to generate another resonant frequency. Thus, the antenna structure of the present disclosure can provide multiple frequency bands and great radiation characteristics in an environment with multiple metals.

17 Claims, 5 Drawing Sheets

(56) References Cited

U.S. PATENT DOCUMENTS

| | | | | |
|---|---|---|---|---|
| 2020/0106167 | A1* | 4/2020 | Moon | H01Q 9/16 |
| 2020/0194879 | A1* | 6/2020 | Lim | H01Q 1/243 |
| 2021/0013607 | A1* | 1/2021 | Tai | H01Q 1/48 |
| 2021/0021025 | A1* | 1/2021 | Kim | H01Q 1/38 |
| 2021/0135378 | A1* | 5/2021 | Cho | H01Q 1/2283 |
| 2021/0175606 | A1* | 6/2021 | Ramasamy | H01Q 1/52 |
| 2021/0175610 | A1* | 6/2021 | Ramasamy | H01Q 1/2266 |
| 2022/0124913 | A1* | 4/2022 | Kwak | G09F 9/30 |
| 2023/0096131 | A1* | 3/2023 | Wei | H01Q 1/02 343/866 |
| 2023/0109587 | A1* | 4/2023 | Lee | H01Q 1/2266 343/702 |
| 2023/0216173 | A1* | 7/2023 | Chang | H01Q 1/2283 343/702 |
| 2023/0223681 | A1* | 7/2023 | Barrera | H01Q 1/2291 343/702 |
| 2023/0229211 | A1* | 7/2023 | He | G06F 1/1698 361/679.46 |
| 2023/0411828 | A1* | 12/2023 | Peng | H01Q 5/371 |

* cited by examiner

ANTENNA STRUCTURE AND ELECTRONIC DEVICE

RELATED APPLICATIONS

This application claims the benefit of priority to Taiwan Patent Application No. 112137339, filed on Sep. 28, 2023. The entire content of the above identified application is incorporated herein by reference.

BACKGROUND

Technical Field

The present disclosure relates to an antenna structure and an electronic device, in particular to a slot antenna structure and an electronic device.

Description of Related Art

In recent years, electronic devices not only require good communication transmission quality but also demand aesthetics and slimness in the market. Furthermore, user expectations for the user experience with electronic devices are increasing. For example, in the case of laptops, due to the high demand for a large screen-to-body ratio, antenna structure placement tends to be at the system end. However, the high component density in laptop system end, combined with the presence of numerous metal components, significantly affects the radiation characteristics of antenna structure.

In view of this, providing an antenna structure that has multiple frequency bands and great radiation characteristics in electronic devices has become an important issue for relevant industry players in antenna structure design.

SUMMARY

An object of the present disclosure is to provide an antenna structure and an electronic device that can provide multi frequency bands and great radiation characteristics in an environment where numerous metal components exist.

One embodiment of the structural configuration according to the present disclosure provides an antenna structure disposed in a case. The antenna structure includes a blocking part, a cooling module, an antenna module, and a ground component. The cooling module is disposed on a side of the blocking part. The antenna module is disposed on the side of the blocking part and has an interval space between the antenna module and the cooling module along a first direction. The ground component is disposed in the interval space, and is electrically connected to the antenna module and the cooling module. The ground component, the antenna module, and the cooling module jointly define a slot in the interval space. The antenna module has a resonant frequency. The antenna module couples and excites the slot to generate another resonant frequency.

Another embodiment of the structural configuration according to the present disclosure provides an electronic device which includes a case and an antenna structure. The antenna structure is disposed in the case and includes a blocking part, a cooling module, an antenna module, and a ground component. The cooling module is disposed on a side of the blocking part. The antenna module is disposed on the side of the blocking part and has an interval space between the antenna module and the cooling module along a first direction. The ground component is disposed in the interval space, and is electrically connected to the antenna module and the cooling module. The ground component, the antenna module, and the cooling module jointly define a slot in the interval space. The antenna module has a resonant frequency. The antenna module couples and excites the slot to generate another resonant frequency.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION

Figure 1:
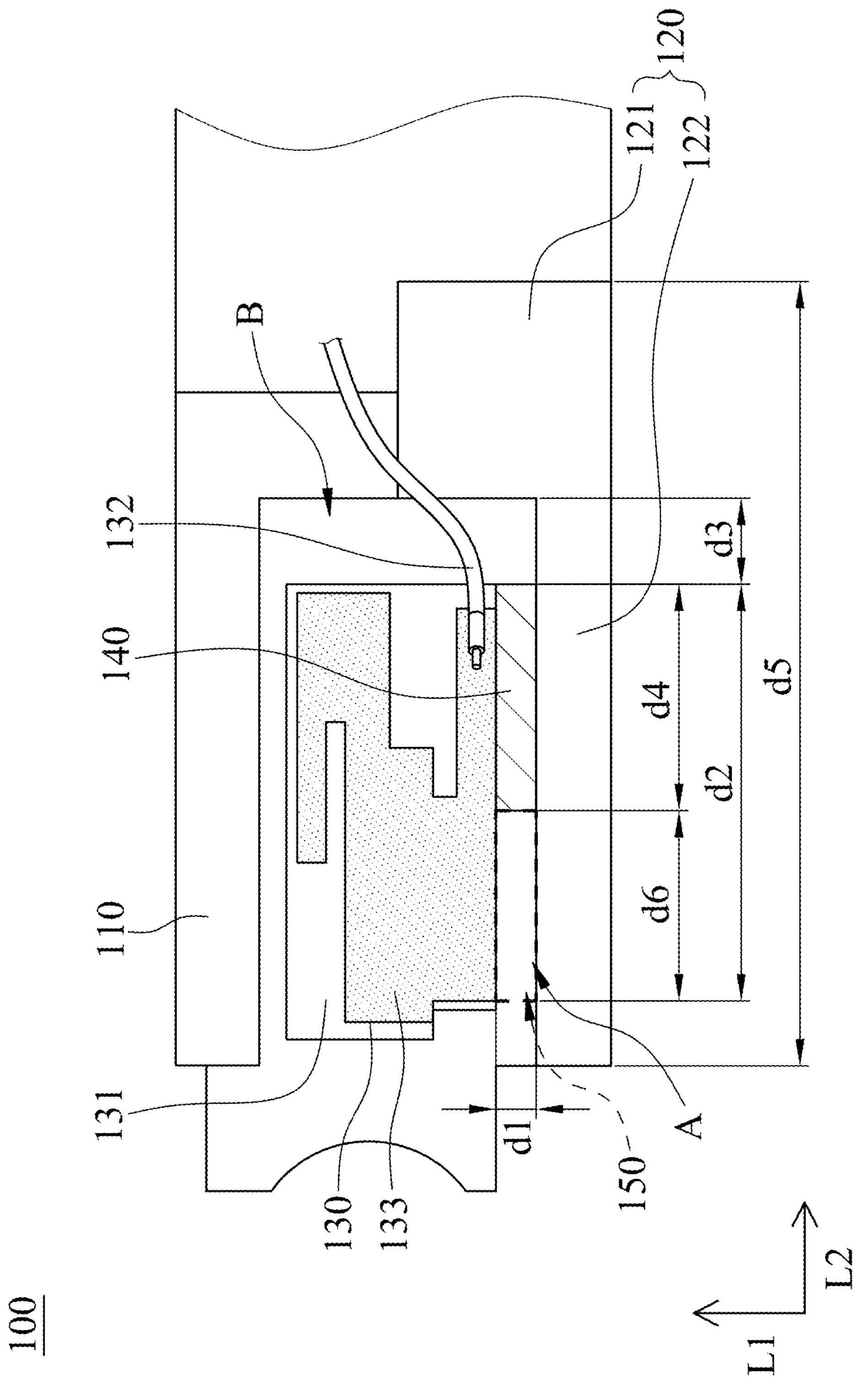
FIG. 1 is a schematic view of an antenna structure according to first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an" and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
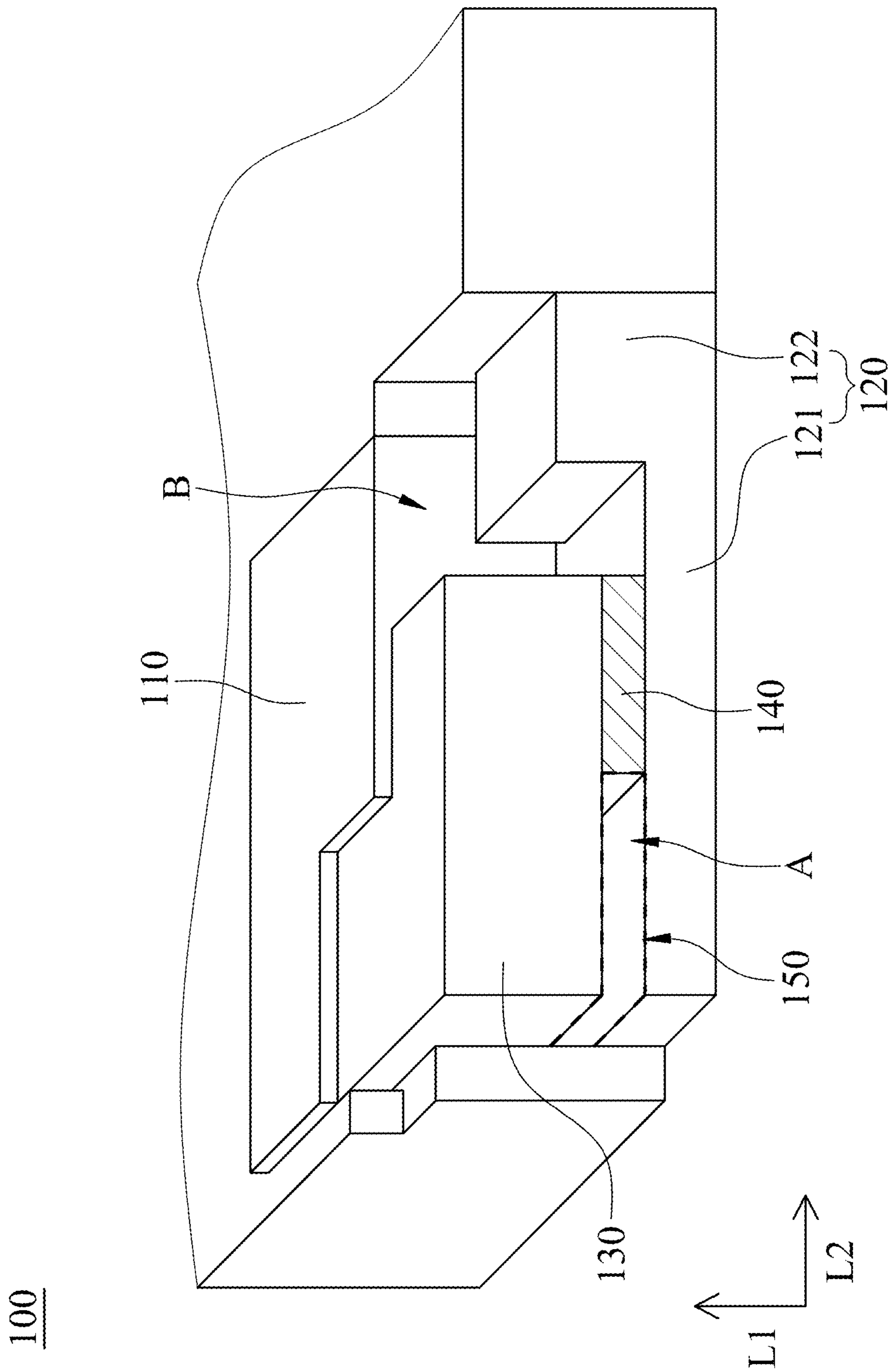
FIG. 2 is a schematic view of an interval space and a margin space of the antenna structure as shown in FIG. 1.

Refers to FIG. 1 and FIG. 2. FIG. 1 is a schematic view of an antenna structure 100 according to first embodiment of the present disclosure. FIG. 2 is a schematic view of an interval space A and a margin space B of the antenna structure 100 as shown in FIG. 1. The antenna structure 100 is disposed in a case (not shown in the figure). The antenna structure 100 includes a blocking part 110, a cooling module 120, an antenna module 130, a ground component 140 and a slot 150. The cooling module 120 and the antenna module 130 are disposed on a side of the blocking part 110. The ground component 140 and the slot 150 are disposed between the cooling module 120 and the antenna module 130. In the first embodiment, taking a laptop as an example, the case is an outer shell of C surface and D surface of the laptop. The blocking part 110 is a portion of a hinge of the laptop. The cooling module 120 is a built-in cooling system of the laptop. The ground component 140 is an EMI gasket. The ground component 140 is joined to a system ground of the laptop, but the present disclosure is not limited thereto.

The antenna module 130 has an interval space A between the antenna module 130 and the cooling module 120 along a first direction L1. The antenna module 130 has a margin space B between the antenna module 130 and the cooling module 120 along a second direction L2. The first direction L1 is perpendicular to the second direction L2. The ground component 140 is disposed in the interval space A and is adjacent to the margin space B. The ground component 140 is electrically connected to the antenna module 130 and the cooling module 120. The ground component 140, the antenna module 130, and the cooling module 120 jointly define the slot 150 in the interval space A. In the first embodiment, the slot 150 is an open slot.

Figure 3:
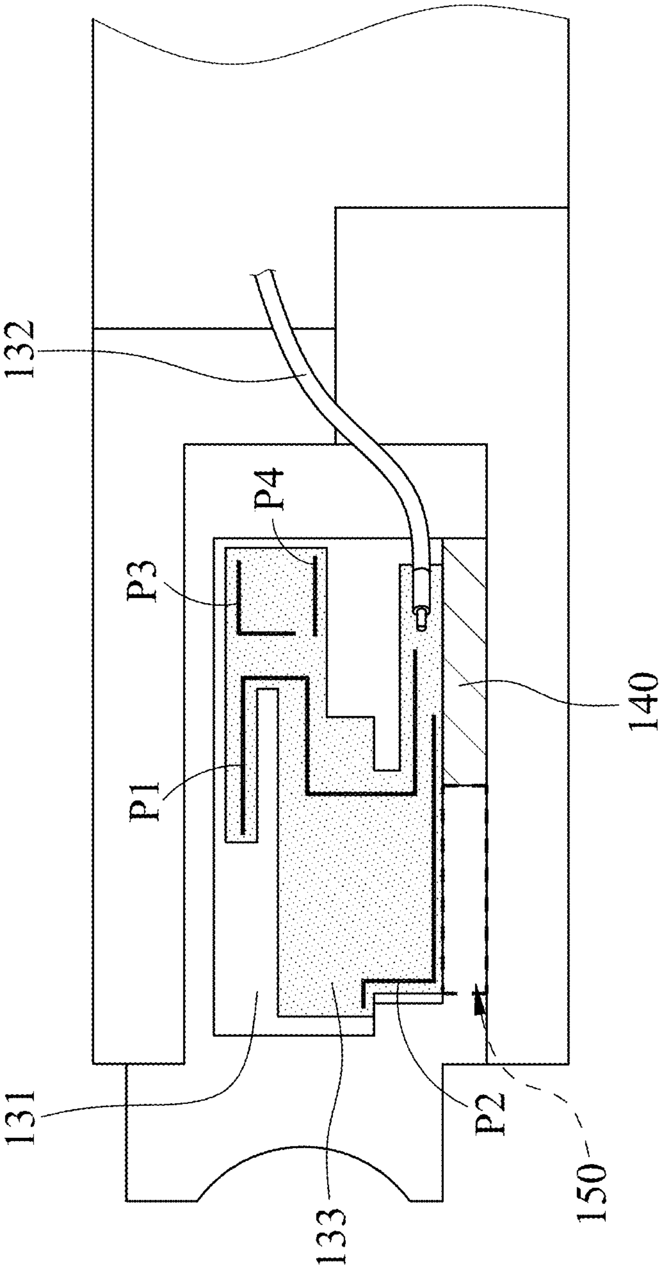
FIG. 3 is a schematic view of a first path, a second path, a third path, and a fourth path on the radiation element of the antenna structure as shown in FIG. 1.

The cooling module 120 is L-shaped, which includes a first part 121 and a second part 122. The antenna module 130 has the interval space A between the antenna module 130 and the first part 121 along the first direction L1. The antenna module 130 has the margin space B between the antenna module 130 and the second part 122 along the second direction L2. As shown in FIG. 1 and FIG. 3, in the first embodiment, a length d1 of the interval space A along the first direction L1 is between 0.5 mm and 3 mm. A length d2 of the interval space A along the second direction L2 is between 6 mm and 36 mm. A length d3 of the margin space B along the second direction L2 is between 5 mm and 7 mm. A length d4 of the blocking part 110 along the second direction L2 is between 1 mm and 16 mm. A length d5 of the cooling module 120 along the second direction L2 is between 20 mm and 60 mm. A length d6 of the slot 150 along the second direction L2 is between 5 mm and 20 mm.

The antenna module 130 has a resonant frequency. The antenna module 130 couples and excites the slot 150 to generate another resonant frequency. The antenna module 130 includes a base 131, a feeding element 132, and a radiation element 133. The feeding element 132 and the radiation element 133 are disposed on the base 131. The radiation element 133 is connected to the feeding element 132 and the ground component 140. The feeding element 132 is electrically connected to a coaxial transmission line (not shown in the figure) to couple a signal source (not shown in the figure) and is configured to feed a signal. The radiation element 133 feeds the signal through the feeding element 132 to generate the resonant frequency, and couples and excites the slot 150 to generate another resonant frequency so as to generate emission signals in multiple frequency bands.

It is noted that, the connection between the blocking part 110 and the cooling module 120 is capable of forming a partition-like structure to isolate the antenna module 130 from a system circuit (not shown in the figure) of the laptop, thereby effectively reducing the interference of system circuit noise on the antenna module 130 and further enhancing the radiation efficiency of the antenna module 130.

Figure 4:
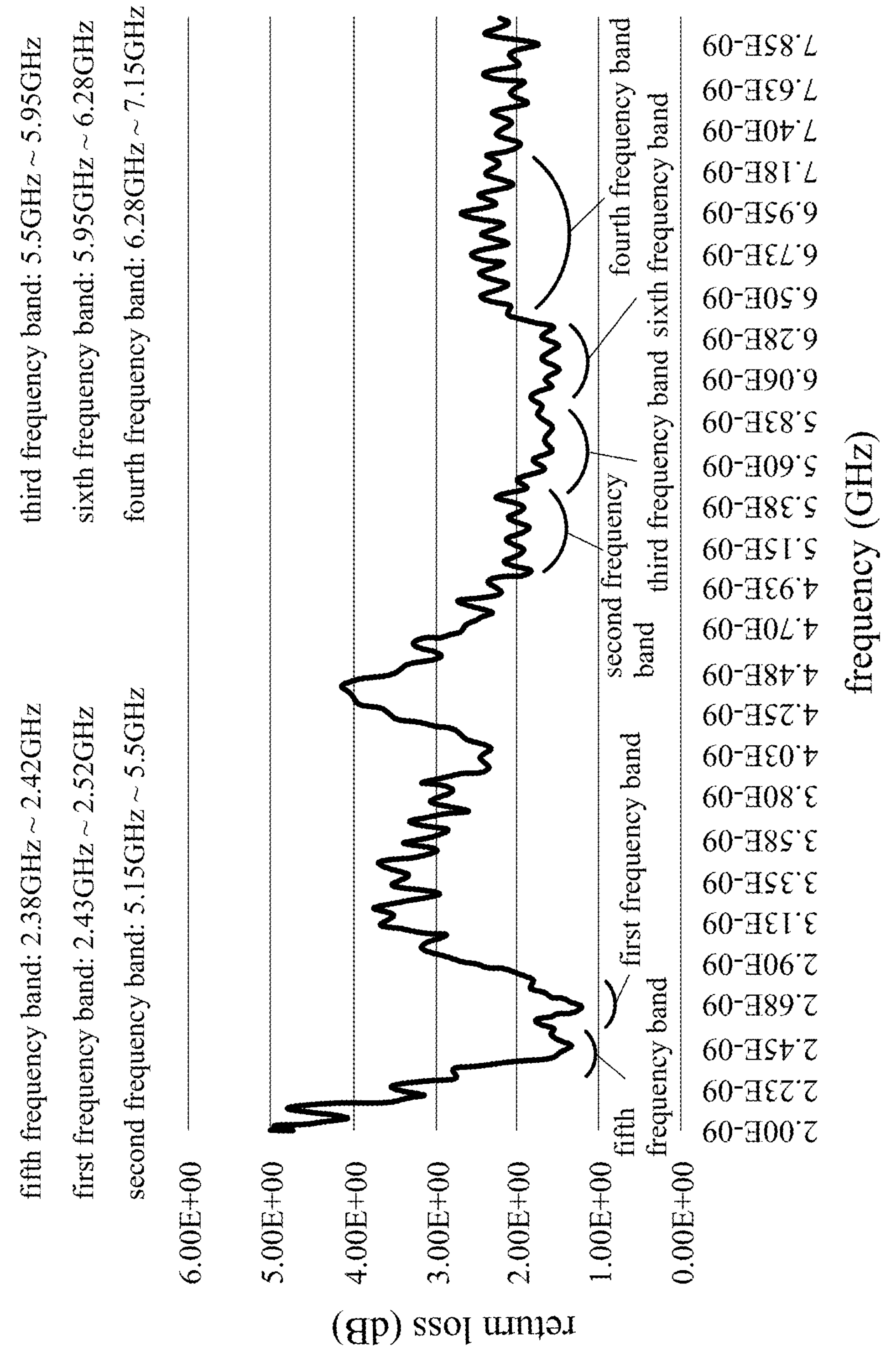
FIG. 4 is a total band width waveform according to frequency and return loss of the antenna structure as shown in FIG. 3.

Refers to FIG. 3 and FIG. 4. FIG. 3 is a schematic view of a first path P1, a second path P2, a third path P3, and a fourth path P4 on the radiation element 133 of the antenna structure 100 as shown in FIG. 1. FIG. 4 is a total band width waveform according to frequency and return loss of the antenna structure 100 as shown in FIG. 3. The radiation element 133 includes a first path P1, a second path P2, a third path P3, and a fourth path P4. The resonant frequency generated by the signal fed by the radiation element 133 includes a first frequency band, a second frequency band, a third frequency band, and a fourth frequency band. The first path P1 generates the first frequency band. The first frequency band is between 2.43 GHz and 2.52 GHz. The second path P2 generates the second frequency band. The second frequency band is between 5.15 GHz and 5.5 GHz. The third path P3 generates the third frequency band. The third frequency band is between 5.5 GHz and 5.95 GHz. The fourth path P4 generates the fourth frequency band. The fourth frequency band is between 6.28 GHz and 7.15 GHz. The another frequency band generated by coupling and excitation the slot 150 by the antenna module 130 includes a fifth frequency band and a sixth frequency band. The fifth frequency band is between 2.38 GHz and 2.42 GHz, and the sixth frequency band is between 5.95 GHz and 6.28 GHz.

Specifically, the first path P1 of the radiation element 133 can provide a low frequency mode and contributes a part of low frequency characteristics. The second path P2 and the third path P3 of the radiation element 133 can provide a high frequency mode and contributes 5G frequency band characteristics. The fourth path P4 of the radiation element 133 can provide a high frequency mode and contributes Wi-Fi 6E frequency band characteristics. Through the coupling and excitation of the slot 150 by the antenna module 130, low order modes and high frequency high order modes can be provided.

In this way, through the slot 150 jointly defined in the case by the ground component 140, the antenna module 130, and the cooling module 120, along with the design of the excitation of the slot 150 by the radiation element 133, it can enhance the radiation efficiency by approximately 40 MHz bandwidth and about 15% efficiency contribution for the low frequency portion, and enhance approximately 300 MHz bandwidth efficiency for the high frequency portion.

Figure 5:
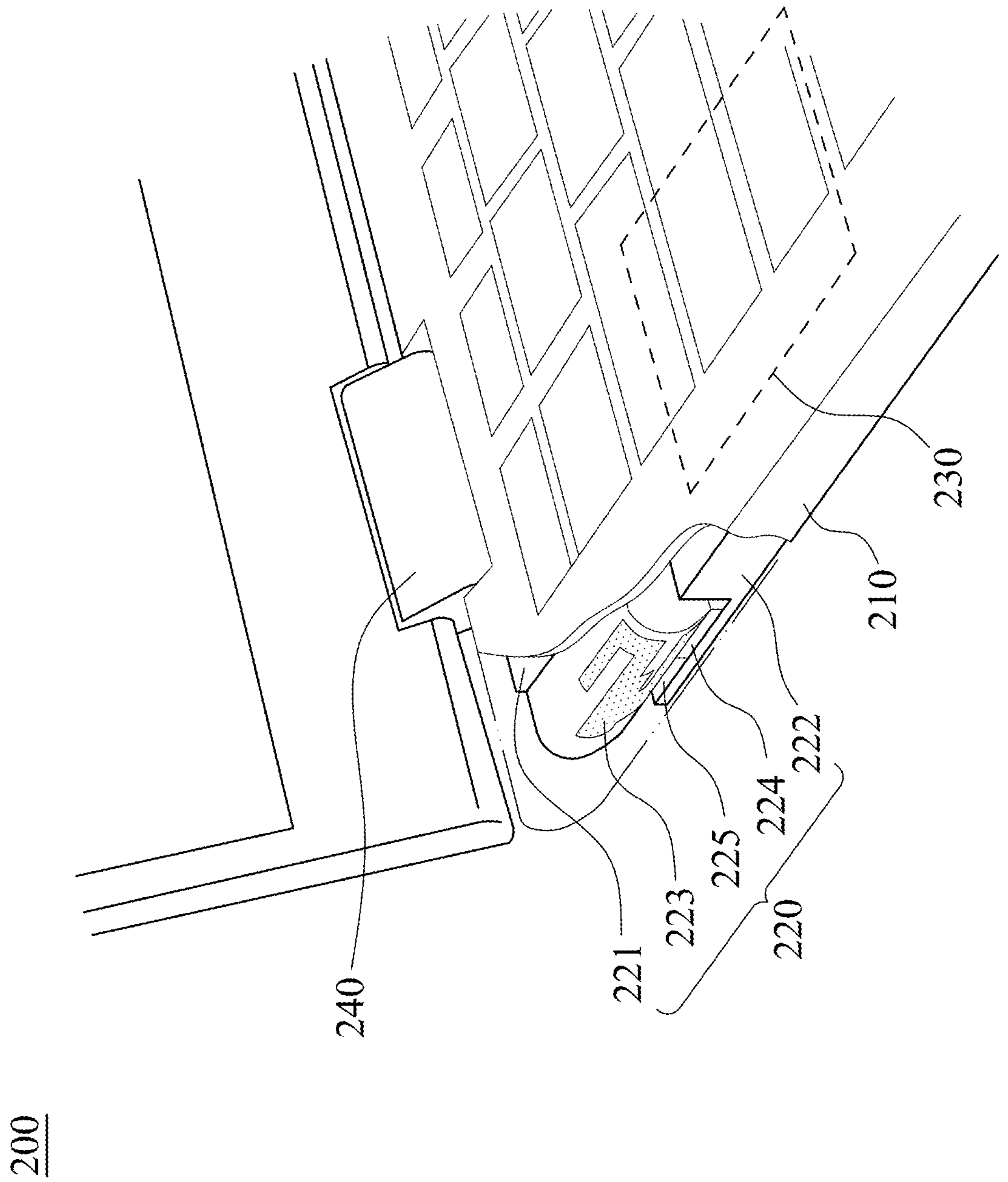
FIG. 5 is a schematic view of an electronic device according to second embodiment of the present disclosure.

Refers to FIG. 5. FIG. 5 is a schematic view of an electronic device 200 according to second embodiment of the present disclosure. The electronic device 200 includes a case 210, an antenna structure 220, a system circuit 230, and a hinge 240. The antenna structure 220, the system circuit 230, and the hinge 240 are disposed in the case 210. In the second embodiment, the electronic device 200 is a laptop. The case 210 is an outer shell of C surface and D surface of the laptop. The system circuit 230 is a hardware circuit of the laptop, but the present disclosure is not limited thereto.

The antenna structure 220 includes a blocking part 221, a cooling module 222, an antenna module 223, a ground component 224, and a slot 225. The blocking part 221 is connected to the cooling module 222 and isolates the antenna module 223 and the system circuit 230. The connection between the blocking part 221 and the cooling module 222 is capable of forming a partition-like structure to isolate the antenna module 223 and the system circuit 230, thereby reducing the impact of numerous metal components in the densely packed system circuit 230 on the antenna module 223 and further enhances the radiation efficiency of the antenna module 223. The blocking part 221 is a portion of the hinge 240. In addition, in the second embodiment, the cooling module 222, the antenna module 223, the ground component 224, and the slot 225 are respectively the same or similar to the cooling module 120, the antenna module 130, the ground component 140, and the slot 150 in the first embodiment, and will not be repeated herein.

From the above embodiments, the present disclosure has the following advantages. Firstly, through a slot jointly defined by the ground component, the antenna module, and the cooling module, along with the design that the radiation element excites a slot, it can excite emission signals for multiple frequency bands. Secondly, a partition-like structure formed by connecting the blocking part and the cooling module can isolate the antenna module from the system circuit, effectively reducing the impact of numerous metal components in the system circuit on the antenna module, and further improving the radiation efficiency of the antenna module.

The foregoing description of the disclosure has been presented only for the purposes of illustration and description option of the exemplary embodiments and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure disposed in a case, comprising:

a blocking part;

a cooling module disposed on a side of the blocking part;

an antenna module disposed on the side of the blocking part and having an interval space between the antenna module and the cooling module along a first direction; and a ground component disposed in the interval space and electrically connected to the antenna module and the cooling module, the ground component, the antenna module, and the cooling module jointly defining a slot in the interval space, wherein the antenna module has a resonant frequency, and the antenna module couples and excites the slot to generate another resonant frequency.

2. The antenna structure according to claim 1, wherein the antenna module comprises:

a base;

a feeding element disposed on the base and configured to feed a signal; and a radiation element disposed on the base and connected to the feeding element and the ground component, the radiation element feeding the signal through the feeding element to generate the resonant frequency, and coupling and exciting the slot to generate the another resonant frequency.

3. The antenna structure according to claim 2, wherein the radiation element comprises a first path, a second path, a third path, and a fourth path, the resonant frequency comprises a first frequency band, a second frequency band, a third frequency band, and a fourth frequency band, wherein the first path generates the first frequency band, and the first frequency band is between 2.43 GHz and 2.52 GHz, the second path generates the second frequency band, and the second frequency band is between 5.15 GHz and 5.5 GHz, the third path generates the third frequency band, and the third frequency band is between 5.5 GHz and 5.95 GHz, and the fourth path generates the fourth frequency band, and the fourth frequency band is between 6.28 GHz and 7.15 GHz.

4. The antenna structure according to claim 2, wherein the another resonant frequency generated by the antenna module coupling to excite the slot comprises a fifth frequency band and a sixth frequency band, wherein the fifth frequency band is between 2.38 GHz and 2.42 GHz, and the sixth frequency band is between 5.95 GHz and 6.28 GHz.

5. The antenna structure according to claim 1, wherein the antenna module has a margin space between the antenna module and the cooling module along a second direction, the second direction is perpendicular to the first direction, and the ground component is adjacent to the margin space.

6. The antenna structure according to claim 5, wherein the cooling module is L-shaped and comprises a first part and a second part;

the antenna module has the interval space between the antenna module and the first part along the first direction; and the antenna module has the margin space between the antenna module and the second part along the second direction.

7. The antenna structure according to claim 6, wherein a length of the interval space along the first direction is between 0.5 mm and 3 mm, a length of the margin space along the second direction is between 5 mm and 7 mm, a length of the slot along the second direction is between 5 mm and 20 mm.

8. The antenna structure according to claim 1, wherein the blocking part is a portion of a hinge of an electronic device.

9. An electronic device, comprising:

a case; and an antenna structure disposed in the case, comprising:

a blocking part;

a cooling module disposed on a side of the blocking part;

an antenna module disposed on the side of the blocking part and having an interval space between the antenna module and the cooling module along a first direction; and a ground component disposed in the interval space and electrically connected to the antenna module and the cooling module, the ground component, the antenna module, and the cooling module jointly defining a slot in the interval space, wherein the antenna module has a resonant frequency, and the antenna module couples and excites the slot to generate another resonant frequency.

10. The electronic device according to claim 9, wherein the antenna module comprises:

a base;

a feeding element disposed on the base and configured to feed a signal; and a radiation element disposed on the base and connected to the feeding element and the ground component, the radiation element feeding the signal through the feeding element to generate the resonant frequency, and coupling and exciting the slot to generate the another resonant frequency.

11. The electronic device according to claim 10, wherein the radiation element comprises a first path, a second path, a third path, and a fourth path, the resonant frequency comprises a first frequency band, a second frequency band, a third frequency band, and a fourth frequency band, wherein the first path generates the first frequency band, and the first frequency band is between 2.43 GHz and 2.52 GHz, the second path generates the second frequency band, and the second frequency band is between 5.15 GHz and 5.5 GHz, the third path generates the third frequency band, and the third frequency band is between 5.5 GHz and 5.95 GHz, and the fourth path generates the fourth frequency band, the fourth frequency band is between 6.28 GHz and 7.15 GHz.

12. The electronic device according to claim 10, wherein the another resonant frequency generated by the antenna module coupling to excite the slot comprises a fifth frequency band and a sixth frequency band, wherein the fifth frequency band is between 2.38 GHz and 2.42 GHz, and the sixth frequency band is between 5.95 GHz and 6.28 GHz.

13. The electronic device according to claim 9, wherein the antenna module has a margin space between the antenna module and the cooling module along a second direction, the second direction is perpendicular to the first direction, and the ground component is adjacent to the margin space.

14. The electronic device according to claim 13, wherein the cooling module is L-shaped and comprises a first part and a second part;

the antenna module has the interval space between the antenna module and the first part along the first direction;

the antenna module has the margin space between the antenna module and the second part along the second direction.

15. The electronic device according to claim 14, wherein a length of the interval space along the first direction is between 0.5 mm and 3 mm, a length of the margin space along the second direction is between 5 mm and 7 mm, a length of the slot along the second direction is between 5 mm and 20 mm.

16. The electronic device according to claim 9, further comprising:

a system circuit disposed in the case, wherein the blocking part and the cooling module are connected to isolate the antenna module and the system circuit.

17. The electronic device according to claim 9, further comprising:

a hinge disposed on the case, wherein the blocking part is a portion of the hinge.

* * * * *